(12) United States Patent
Giulietti et al.

(10) Patent No.: US 10,195,667 B2
(45) Date of Patent: Feb. 5, 2019

(54) POWDER REMOVAL SYSTEMS

(71) Applicant: Delavan Inc, West Des Moines, IA (US)

(72) Inventors: Diana Giulietti, Tariffville, CT (US); Eric Karlen, Rockford, IL (US); Kiley J. Versluys, Hartford, CT (US)

(73) Assignee: Delavan Inc., West Des Moines, IA (US)

( * ) Notice: Subject to any disclaimer, the term of this patent is extended or adjusted under 35 U.S.C. 154(b) by 360 days.

(21) Appl. No.: 14/948,726

(22) Filed: Nov. 23, 2015

(65) Prior Publication Data

US 2017/0144226 A1    May 25, 2017

(51) Int. Cl.
| | | |
|---|---|---|
| *B22F 3/00* | (2006.01) | |
| *B22F 3/24* | (2006.01) | |
| *B33Y 40/00* | (2015.01) | |
| *B22F 3/105* | (2006.01) | |
| *B29C 64/35* | (2017.01) | |
| *B08B 3/12* | (2006.01) | |
| *B08B 9/00* | (2006.01) | |

(52) U.S. Cl.
CPC .................. *B22F 3/24* (2013.01); *B08B 3/12* (2013.01); *B08B 9/00* (2013.01); *B22F 3/1055* (2013.01); *B29C 64/35* (2017.08); *B33Y 40/00* (2014.12); *B08B 2209/005* (2013.01); *B22F 2003/1059* (2013.01); *B22F 2003/247* (2013.01); *B22F 2999/00* (2013.01); *Y02P 10/295* (2015.11)

(58) Field of Classification Search
CPC .................. B22F 3/24; B22F 3/1055

USPC .......................................................... 419/26
See application file for complete search history.

(56) References Cited

U.S. PATENT DOCUMENTS

| | | | |
|---|---|---|---|
| 5,707,453 A | 1/1998 | Shurman et al. | |
| 6,375,874 B1 | 4/2002 | Russell et al. | |
| 2005/0007430 A1 | 1/2005 | Rowe et al. | |
| 2010/0132747 A1 | 6/2010 | Smith et al. | |
| 2017/0113302 A1* | 4/2017 | Bruck | B23K 26/342 |

FOREIGN PATENT DOCUMENTS

| | | |
|---|---|---|
| CN | 104529458 A | 4/2015 |
| CN | 104801703 A | 7/2015 |
| EP | 799102 A1 | 10/1997 |
| EP | 1127652 A1 | 8/2001 |
| JP | H02257613 A | 10/1990 |
| WO | WO-199619308 A1 | 6/1996 |

OTHER PUBLICATIONS

Examination Report under Section 18(3) of the UK Intellectual Property Office, dated Aug. 21, 2018, in corresponding GB Application No. GB1619801.2.

* cited by examiner

*Primary Examiner* — Mark A Chapman
(74) *Attorney, Agent, or Firm* — Locke Lord LLP; Daniel J. Fiorello

(57) ABSTRACT

A method includes placing an additively manufactured article having one or more internal channels in a non-reactive liquid to remove remainder powder from within the one or more internal channels, wherein the non-reactive liquid is a gas at room temperature and/or pressure. Placing the additively manufactured article in the non-reactive liquid includes can include placing the additively manufactured article in liquid nitrogen.

11 Claims, 3 Drawing Sheets

POWDER REMOVAL SYSTEMS

BACKGROUND

1. Field

The present disclosure relates to additive manufacturing, more specifically to powder removal systems for additively manufacture articles.

2. Description of Related Art

Powder Bed Fusion (PBF) additive manufacturing provides the ability produce extremely complex parts for a fraction of the cost of conventional additive manufacturing methods. However, due to the process of PBF, loose powder can become entrapped in complex internal geometry, even after gross powder removal using a vacuum or air gun, for example. Entrapped powder must be removed completely before post processing and thermal treatment to prevent undesirable sintering of the loose powder or exposure of sensitive mechanics to loose powder.

Current powder removal methods rely on gross removal methods like vacuum cleaning, forced air from a vacuum, or more targeted methods including vibrational removal or chemical removal. These approaches, however, have limitations. For example, gross powder removal does not clear small and/or complex internal channels, vibrational removal depends greatly on the geometry of the part and how well vibrations distribute through the part, and chemical removal can sometimes compromise material integrity.

Such conventional methods and systems have generally been considered satisfactory for their intended purpose. However, there is still a need in the art for improved additive manufacturing systems and methods. The present disclosure provides a solution for this need.

SUMMARY

A method includes placing an additively manufactured article having one or more internal channels in a non-reactive liquid to remove remainder powder from within the one or more internal channels, wherein the non-reactive liquid is a gas at room temperature and/or pressure. Placing the additively manufactured article in the non-reactive liquid includes can include placing the additively manufactured article in liquid nitrogen.

The method can include additively manufacturing the additively manufactured article. Additively manufacturing the additively manufactured article includes powder bed fusion and/or electron beam melting.

The method can include thermally contracting a blockage formed by the remainder powder relative to the one or more internal channels of the additively manufactured article to remove the blockage. In certain embodiments, the method can include allowing bubbles to contact the remainder powder within the one or more internal channels to liberate remainder powder. Allowing the bubbles to contact the remainder powder can include allowing the non-reactive liquid to boil to liberate the remainder powder.

Allowing the bubbles to contact the remainder powder can include agitating the non-reactive liquid to create bubbles. In certain embodiments, agitating the non-reactive liquid can include using a tuyere to apply vibration to the non-reactive liquid.

The method can include applying a vibratory force to the non-reactive liquid while the additively manufactured article is within the non-reactive liquid to vibrate the remainder powder within the one or more internal channels of the additively manufactured article. In certain embodiments, applying a vibratory force to the non-reactive liquid can include applying a vibratory force to a container holding the non-reactive liquid.

In accordance with at least one aspect of this disclosure, a powder removal system for an additively manufactured article can include a thermal container defining a cavity configured to contain a non-reactive liquid and the additively manufactured article within the thermal container. The non-reactive liquid is a gas at room temperature and/or pressure.

The powder removal system can include at least one of a vibration device attached to the thermal container or a liquid agitator connected to the thermal container and configured to contact the non-reactive liquid. The vibration device can include an ultrasonic vibration device. In certain embodiments, the vibration device can be disposed on the outside of the thermal container.

In certain embodiments, the liquid agitator can include a tuyere disposed through the thermal container and having an agitating portion in the cavity. The system can further include the non-reactive liquid (e.g., non-reactive with the powder material). In certain embodiments, the non-reactive liquid can be liquid nitrogen.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
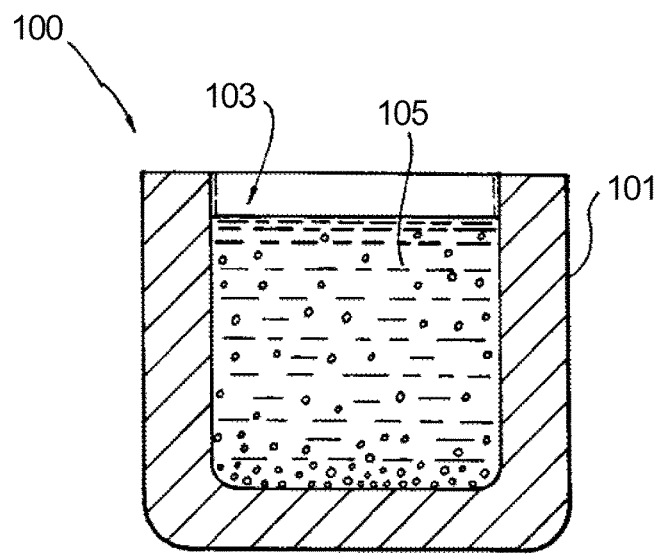
FIG. 1 is a cross-sectional elevation view of an embodiment of a system in accordance with this disclosure, shown having an embodiment of a thermal container with a non-reactive liquid therein.
Figure 2:
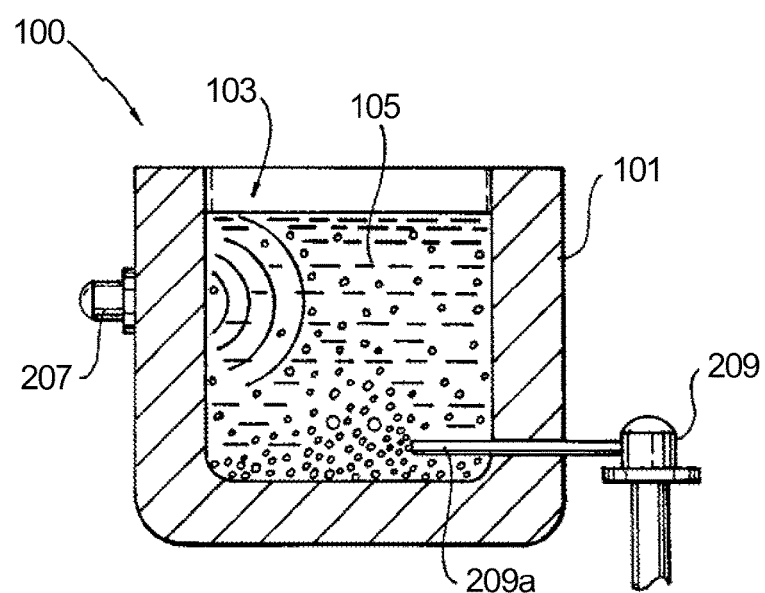
FIG. 2 is a cross-sectional elevation view of an embodiment of the system of FIG. 1 shown including an embodiment of a vibration device and an embodiment of an agitator.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-3D. The systems and methods described herein can be used to improve additive manufacturing processes (e.g., including powder removal from internal cavities).

Figure 3A:
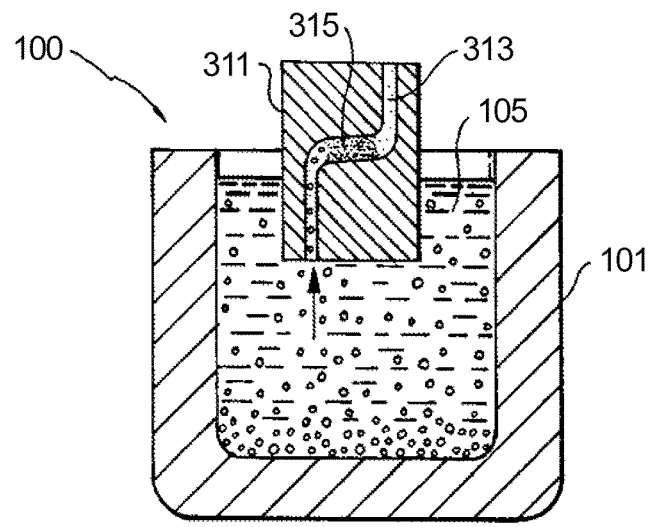
FIG. 3A is a cross-sectional elevation view of the system of FIG. 1, shown having an additively manufactured article with a blockage being inserted into the system.

Referring to FIG. 1, a powder removal system 100 for an additively manufactured article can include a thermal container 101 defining a cavity 103 configured to contain a non-reactive liquid 105 and an additively manufactured article (e.g., article 311 as shown in FIG. 3A) within the thermal container 101. As descried herein, the non-reactive liquid 105 can be non-reactive with the powder material that makes up the additively manufactured article 311.

The non-reactive liquid 105 can be a gas at room temperature and/or pressure such that the non-reactive liquid 105 has a tendency to boil and evaporate at room temperature (e.g., to create bubbles and/or to evaporate from the additively manufactured article 311). In certain embodiments, the non-reactive liquid 105 can be liquid nitrogen (shown bubbling in FIGS. 1-3D). Any other suitable liquid as is appreciated by those skilled in the art is contemplated herein (e.g., $CO_2$, propylene, propane).

To enhance bubble creation, the thermal container 101 can include a rough interior defining the cavity 103 and/or any other suitable design to enhance bubble nucleation. In certain embodiments, the thermal container 101 can include nucleation points in predetermined locations to aid bubble creation at and/or near an opening to an internal channel (e.g., internal channel 313 shown in FIG. 3A) of an additively manufactured article 311.

Referring to FIG. 2, the powder removal system 100 can include at least one vibration device 207 attached to the thermal container 101. The vibration device 207 can be any suitable vibratory transducer. For example, the vibration device 207 can include an ultrasonic vibration device. One or more vibration devices 207 can be place on the outside of and/or within the thermal container 101 in any suitable location to transmit vibrations to an additively manufactured article within the thermal container 101.

In certain embodiments, the system 100 can include a liquid agitator 209 connected to the thermal container 101 and configured to contact the non-reactive liquid 105 to agitate the liquid 105 (e.g., to aid in bubble creation). The liquid agitator 209 can include a tuyere having an agitating portion 209a (e.g., for blowing air into the liquid 105) that extends in the cavity 103. As shown, the liquid agitator 209 or any suitable portion thereof can be disposed through (e.g., in a sealed manner) the thermal container 101 (e.g., at a bottom portion of the thermal container 101).

Referring to FIG. 3A-3D, a method includes placing an additively manufactured article 311 having one or more internal channels 313 in a non-reactive liquid 105 to remove remainder powder 315 from within the one or more internal channels 313. For example, the article 311 can be exposed to liquid nitrogen for several minutes.

Certain additively manufactured articles 311 (e.g., those with complex inner geometry) may require exposure to the liquid 105 several times and/or in different orientations to enhance powder removal. Dimensional analysis can be performed on an article 311 to ensure geometric stability for the given time of exposure in the liquid (e.g., liquid nitrogen). The method can further include additively manufacturing the additively manufactured article 311 (e.g., via powder bed fusion and/or electron beam melting).

Figure 3B:
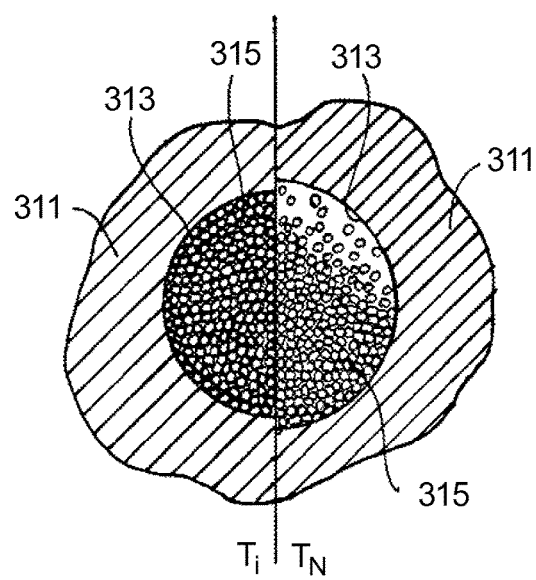
FIG. 3B is a cross-sectional view of an internal channel of the additively manufactured article shown at an initial temperature (on the left) and at the reduced temperature of the non-reactive liquid (on the right)

Referring to FIG. 3B, the method can include thermally contracting a blockage formed by the remainder powder 315 relative to the one or more internal channels 313 of the additively manufactured article 311 to remove the blockage 313. As shown, when the article 311 and remainder powder 315 therein are exposed to liquid nitrogen, the remainder powder 315 will contract relative to the internal channel 313 because the remainder powder 315 has a different coefficient of thermal expansion than the article 311. This can free the blockage within the internal channel 313.

Figure 3C:
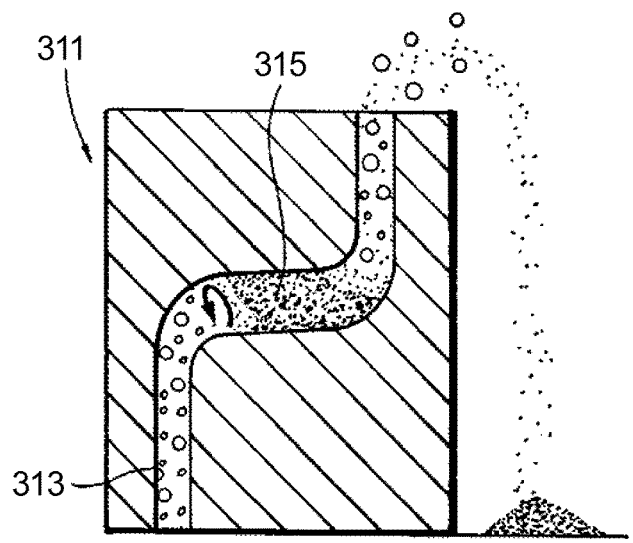
FIG. 3C is a cross-sectional partial elevation view of the additively manufactured article having bubbles within an internal channel thereof.
Figure 3D:
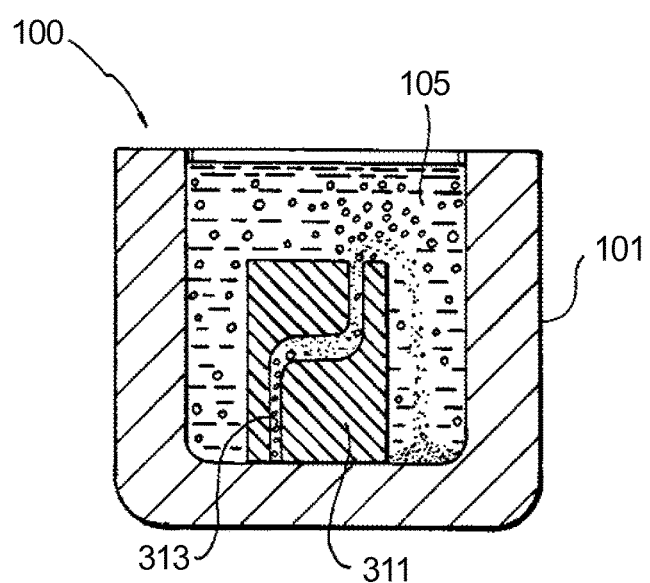
FIG. 3D is a cross-sectional elevation view of the system of FIG. 1, shown having an additively manufactured article disposed therein, wherein the blockage has been liberated from the additively manufactured article.

In certain embodiments, referring to FIGS. 3C and 3D, the method can include allowing bubbles to contact the remainder powder 315 within the one or more internal channels 313 to liberate remainder powder. Allowing the bubbles to contact the remainder powder 315 can include allowing the non-reactive liquid 105 to boil to liberate the remainder powder 315 from within the internal channels.

Allowing the bubbles to contact the remainder powder 315 can include agitating the non-reactive liquid 105 to create bubbles. For example, agitating the non-reactive liquid 105 can include using a tuyere (or any other suitable liquid agitator 209) to apply vibration to the non-reactive liquid 105.

In certain embodiments, the method can include applying a vibratory force (e.g., using an ultrasonic and/or other suitable transducer) to the non-reactive liquid 105 while the additively manufactured article 311 is within the non-reactive liquid 105 to vibrate the remainder powder 315 within the one or more internal channels 313 of the additively manufactured article 311. In certain embodiments, applying a vibratory force to the non-reactive liquid 105 can include applying a vibratory force to a container 101 holding the non-reactive liquid 105.

Gross powder removal methods may be first attempted before using the herein described systems and methods. The article 311 can then be submerged in the container 101 with the liquid 105. In the embodiment utilizing liquid nitrogen, for example, natural agitation due to vaporization impacts the loosely packed entrapped remainder powder 315, eroding away the blockage until the internal channel 313 is free of remainder powder 315. As described above, the liquid nitrogen can also cause minor thermal shock, causing the internal channels to expand temporarily due to the sudden transfer of the article 311 from a heated or room temperature environment to an extremely cool environment. When the article 311 is removed from the liquid nitrogen, any remaining fluid will almost instantaneously vaporize leaving a dry part.

To enhance powder removal, it is contemplated that articles 311 can be preheated in an oven before being placed in liquid nitrogen to induce more dramatic thermal shock. The liquid nitrogen should not evaporate significantly faster with exposure to heated parts due to its low thermal conductivity. Further, the above described vibration devices 207 and/or agitators 209 can be utilized to enhance powder removal. As described above, embodiments of this disclosure increase powder removal efficiency without sacrificing material properties of the article 311.

The methods and systems of the present disclosure, as described above and shown in the drawings, provide for additive manufacturing systems and methods with superior properties including improved powder removal. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A method, comprising:
   placing an additively manufactured article having one or more internal channels in a non-reactive liquid to remove remainder powder from within the one or more internal channels, wherein the non-reactive liquid is a gas at room temperature and/or pressure.

2. The method of claim 1, placing the additively manufactured article in the non-reactive liquid includes placing the additively manufactured article in liquid nitrogen.

3. The method of claim 1, further comprising additively manufacturing the additively manufactured article.

4. The method of claim 3, wherein additively manufacturing the additively manufactured article includes powder bed fusion and/or electron beam melting.

5. The method of claim 1, further comprising thermally contracting a blockage formed by the remainder powder relative to the one or more internal channels of the additively manufactured article to remove the blockage.

6. The method of claim 1, further comprising allowing bubbles to contact the remainder powder within the one or more internal channels to liberate remainder powder.

7. The method of claim 6, wherein allowing the bubbles to contact the remainder powder includes allowing the non-reactive liquid to boil to liberate the remainder powder.

8. The method of claim 6, wherein allowing the bubbles to contact the remainder powder includes agitating the non-reactive liquid to create bubbles.

9. The method of claim 8, wherein agitating the non-reactive liquid includes using a tuyere to apply vibration to the non-reactive liquid.

10. The method of claim 1, further comprising applying a vibratory force to the non-reactive liquid while the additively manufactured article is within the non-reactive liquid to vibrate the remainder powder within the one or more internal channels of the additively manufactured article.

11. The method of claim 10, wherein applying a vibratory force to the non-reactive liquid includes applying a vibratory force to a container holding the non-reactive liquid.

* * * * *